(12) United States Patent
Gaus et al.

(10) Patent No.: US 6,343,277 B1
(45) Date of Patent: Jan. 29, 2002

(54) ENERGY NETWORK COMMERCE SYSTEM

(75) Inventors: John Gaus, Hamden, CT (US); Jeff DeWeese, Maynard, MA (US)

(73) Assignee: Enermetrix.com, Inc., Maynard, MA (US)

( * ) Notice: Subject to any disclaimer, the term of this patent is extended or adjusted under 35 U.S.C. 154(b) by 0 days.

(21) Appl. No.: 09/184,612

(22) Filed: Nov. 2, 1998

(51) Int. Cl.⁷ .............................................. G06F 17/60
(52) U.S. Cl. ........................... 705/37; 705/35; 705/26; 705/400; 235/378
(58) Field of Search ........................... 705/35, 37, 400, 705/26; 235/378

(56) References Cited

U.S. PATENT DOCUMENTS

| 4,789,928 A | 12/1988 | Fujisaki |
| 5,136,501 A | 8/1992 | Silverman et al. |
| 5,237,507 A | 8/1993 | Chasek |
| 5,243,515 A | 9/1993 | Lee |
| 5,394,324 A | 2/1995 | Clearwater |
| 5,519,622 A | 5/1996 | Chasek |
| 5,598,349 A | 1/1997 | Elliason et al. |
| 5,621,654 A | 4/1997 | Cohen et al. |
| 5,715,402 A | 2/1998 | Popolo |
| 5,724,424 A | 3/1998 | Gifford |
| 5,758,328 A | 5/1998 | Giovannoli |
| 5,758,331 A | 5/1998 | Johnson |
| 5,794,207 A | 8/1998 | Walker et al. |
| 5,794,212 A | * 8/1998 | Mistr, Jr. .................... 705/26 |
| 5,794,219 A | * 8/1998 | Brown ........................ 705/37 |
| 5,832,457 A | * 11/1998 | O'Brien et al. ............... 705/14 |
| 6,098,051 A | * 8/2000 | Lupien et al. ................ 705/37 |
| 6,108,639 A | * 8/2000 | Walker et al. ............... 705/26 |
| 6,115,698 A | * 9/2000 | Tuck et al. ................... 705/37 |
| 6,134,534 A | * 10/2000 | Walker et al. ............... 705/26 |
| 6,151,589 A | * 11/2000 | Aggarwal et al. ............ 705/37 |
| 6,161,099 A | * 12/2000 | Harrington et al. .......... 705/37 |
| 6,167,386 A | * 12/2000 | Brown ........................ 705/37 |
| 6,169,977 B1 | * 1/2001 | Hasbani et al. ............. 705/402 |

FOREIGN PATENT DOCUMENTS

WO    WO-0073946    * 12/2000

OTHER PUBLICATIONS

Anonymous, "Continental Power Exchange Launches Trading Price Index" Apr. 1996, Electricity Journal V9n3, pp: 8–9.*

* cited by examiner

Primary Examiner—Eric W. Stamber
Assistant Examiner—Raquel Alvarez
(74) Attorney, Agent, or Firm—Testa, Hurwitz & Thibeault, LLP

(57) ABSTRACT

A computer-assisted method of facilitating a transaction between an energy consumer-client desiring an energy contract and an energy supplier. The method includes posting a buy order where the supplier can access the buy order via a computer network and receiving a bid from the supplier via the network. The method also includes accepting the bid via the network when a precondition is met.

15 Claims, 22 Drawing Sheets

FIG. 2

Agents

| Client Menu | Quick Search | Quick Reports | Support! | Admin Menu |

Agent: Johnson, David
Smith, Bill
Hall, Bobby
Jones, Richard
Lee, Jack

View Agent

New Agent

Title:
Prefix:
Name: _____  _____  _____
       First    MI     Last
Address: _____
         _____
         City    State   ZIP
E-Mail: _____

Phone
Work:
Fax:
Mobile:
Home:

Note:

Counties: _____     Agent Note

Modify List

Commission: _____

Update     Reset     Restore

Admin Menu

Gas Account

| Client Menu | Quick Search | Quick Reports | Support | Admin Menu |

NAP Account #: [1005]

[View Account]

[New Account]

NAP Account #: 1005
Client Name: Pleasant Enlarged School District  Location: Vine Terrace Elementary School
LDC Account #: 78-1706-018-1234  Gas LDC: Niagara Mohawk
Zone Name: To Be Assigned ▽  [Change LDC]

Gas LDC Office: Syracuse ▽
LDC Rate Class: SC1 ▽
Meter Type: TeleMeter ▽
Meter Read Freq:

Commitment Level: Select Service Type ▽
Service Size:
Service Pressure:
Capacity Release: ☑ (if checked, fill in Capacity Plan)
Capacity Plan:

Consumption
Annual: 13099
Daily Average: 218.32

Current Piplines: CNG
[Modify List]

Note:

[◁ ▷]

[Update]  [Reset]  [Restore]

[Contract List]  [Cost]  [Consumption]  [Account Contacts]
[Locations]  [Client Contact]  [Client Menu]

FIG. 5

| *Contract List* | Client Menu | Quick Search | Quick Reports | Support | Admin Menu |

Client Name: Pleasant Enlarged School District    Location: Vine Terrace Elementary School Gas Contracts for Account: 1005                                                      11/17/97

| Contract ID | Start Date | End Date | Length | Supplier | DPoint Price | Avg Usage/Day |

| New Contract | | Accounts | Locations | | Client Contact | Client Menu |

FIG. 6

Contract Detail | Client Menu | Quick Search | Quick Reports | Support | Admin Menu Client Name: Pleasant Enlarged School District    Location: Vine Terrace Elementary School Start Date: 11/17/97    Contract Length: ☐ Months    End Date:   
mm/dd/yy Gas Contract ID: New Contract Gas Supplier: New Contract ▽
Pricing: Fixed ▽
Days Recallable: N/A - Interruptable Account
Load Shape Class: Flat ▽
Commission: ☐
Commission Formula: Select commission formula ▽
Contract Status: Future ▽
Note:

Index Used: Fixed Price ▽
Index Price:
If fixed pricing is used, fill in Basis & Commodity
Basis Price/Dth:
Commodity Price/Dth:
Total Price/Dth:
Target Price@CG$/Dth:
Meter Requirement:

[Update]    [Reset]    [Restore]

[Accounts]   [Contract List]   [Locations]   [Client Contact]   [Client Menu]

| Gas Costs | Client Menu | Quick Search | Quick Reports | Support | Admin Menu |

12-Month Gas Account Cost Review

Client Name: Pleasant Enlarged School District    Location: Vine Terrace Elementary School Select Year: 1997 ▽    View Year
Select a year to view Monthly Costs for NAP Account #: 1005

| | Dec 1996 | Jan 1997 | Feb 1997 | Mar 1997 | Apr 1997 | May 1997 | Jun 1997 | Jul 1997 | Aug 1997 | Sep 1997 | Oct 1997 | Nov 1997 | Totals | Meter Price |
|---|---|---|---|---|---|---|---|---|---|---|---|---|---|---|
| DPoint Price | | | | | | | | | | | | | | |
| Supplier Base Cost | | | | | | | | | | | | | | |
| Supplier Overuse | | | | | | | | | | | | | | |
| Supplier Underuse | | | | | | | | | | | | | | |
| Supplier Total | ($1.00) | | | | | | | | | | | | | |
| LDC Base Cost | | | | | | | | | | | | | | |
| LDC Overuse | | | | | | | | | | | | | | |
| LDC Underuse | | | | | | | | | | | | | | |
| LDC Total | ($1.00) | | | | | | | | | | | | | |
| Total Bill | ($2.00) | | | | | | | | | | | | ($2.00) | |
| Meter Price | | | | | | | | | | | | | | |

Gas Cost Account Notes:
December 1996 Notes:
   Customer Note:

LDC Note:

| Update Dec 1996 Data |     | Input Jan 1997 Data |

| Consumption |   | Accounts |   | Locations |   | Client Contact |   | Client Menu |

Gas Consumption

| Client Menu | Quick Search | Quick Reports | Support! | Admin Menu |

12-Month Gas Account Cost Review

Client Name: Pleasant Enlarged School District   Location: Vine Terrace Elementary School Select Year: 1997 ▽    [View Year]

Select a year to view

Monthly Consumptions for NAP Account #1005

| | Dec 1996 | Jan 1997 | Feb 1997 | Mar 1997 | Apr 1997 | May 1997 | Jun 1997 | Jul 1997 | Aug 1997 | Sep 1997 | Oct 1997 | Nov 1997 | Totals | Avg. Day |
|---|---|---|---|---|---|---|---|---|---|---|---|---|---|---|
| Actual Dpoint (Dth) | | | | | | | | | | | | | | |
| Actual Meter (Dth) | 7128 | | | | | | | | | | | | 7128 | 19.53 |
| Days Interrupted | | | | | | | | | | | | | | |

Gas Cost Account Notes:
December 1996 Notes:

[Update Dec 1996 Data]   [Input Jan 1997 Data]   [View Load Shape]

[Cost]   [Accounts]   [Locations]   [Client Contact]   [Client Menu]

FIG. 9

| Gas consumption | Client Menu | Quick Search | Quick Reports | Support! | Admin Menu |

Historical 12-Month Gas Account Cost & Consumption Information
Client Name: Pleasant Enlarged School District  Location: Vine Terrace Elementary School

Enter New Monthly Cost & Consumption Info for NAP Account #1005
January/ 1997

- Account DPoint (Dth)
- Actual Meter (Dth)
- Days Interrupted
- DPoint Price($)
- Supplier-Base-Cost($)
- Supplier Overuse($)
- Supplier Underuse($)
- Supplier Total($)
- LDC Base Cost($)
- LDC Overuse($)
- LDC Underuse($)
- LDC Total($)
- Total Bill($)
- Customer Note
- LDC Note
- Supplier Note
- Cost Note
- Consumption Note

[Update] [Reset] [Restore] [Cancel]

[Cost] [Accounts] [Locations] [Client Contact] [Client Menu]

Gas LDC

Client Menu | Quick Search | Quick Reports | Support! | Admin Menu

LDC Name:
- Niagara Mohawk
- National Fuel Gas
- Rochester Gas and Electric
- New York State Electric and Gas
- Virginia Natural Gas View LDC
New LDC LDC Name: Niagara Mohawk LDC Office List:
- Buffalo
- Rochester
- Syracuse Rate Class List:
- SC1
- SC3

Create Class

Note:

Update | Reset | Restore

LCD Offices | Admin Menu

FIG. 14

*Gas Supplier* | Client Menu | Quick Search | Quick Reports | Support! | Admin Menu

Suppliers:
- Agway Energy Services
- Colonial Energy
- Duke-Louis Dreyfus
- Enron
- Enserch View Supplier
New Supplier

Supplier Name: Agway Energy Services

Supplied LDCs: National Fuel Gas / New York State Electric and Gas

Modify List

Note:

Trader | Assistant/Nominator | Accounts Payable

Title:
Prefix: Mr.
Name: ___ First ___ MI ___ Last
Address: ___
City ___ AK ___ State ___ ZIP
E-Mail: ___

Phone
Work:
Fax:
Mobile:
Home:

Note:

Update | Reset | Admin Menu | Restore

FIG. 15

| Gas Post | Gas Posts | Electric Posts | Support! | Post Home | REX Home |

Post #:
1001 (C)-Virginia Natural Gas
1003 (C)-Virginia Natural Gas
1013 (C)-Virginia Natural Gas
1014 (O)-Virginia Natural Gas
1024 (P)-Virginia Natural Gas

[View Post]
[New Post]

Post #: 1014          NAP Buyer: John Gaus

Status: Open  [Close Bidding]    LCD Name: Virginia Natural Gas

Description: 6 month load shapes

Open Date: 11/24/97          Close Date: 12/26/97

Commission: 0.02             Close Time: 9:45:04 AM

Formula: NAP % of Total

Post-Group List:

| Group# | Description | # of Clients | Total Oth. | First Start Date | Last End Date |
|---|---|---|---|---|---|
| 1 | Regular customers | 0 | | | |
| 2 | First time customers | 1 | 12162 | 1/1/98 | 7/1/98 |
| 3 | 6 month load shapes | 1 | 12162 | 1/1/99 | 7/1/99 |

[Post Groups]  [Load Shape]  [Bid Watch]  [Post Menu]

| *Bid Details* | Gas Posts | Electric Posts | Support! | Post Home | REX Home |

Supplier: Enserch    Last Bid: 11/30/97 7:41:27 PM

Post-Group #: 1027-1    LDC: Virginia Natural Gas

Post Description: Purchases for Dec 2 - buyer2

Group Description: Fixed price purchases

Terms and Conditions:
```
Start Date:   12/01/1997
Index: Fixed Price
GLDC Rate Class: 5
```

Client Contracts included in Post Group:

| # | Client | Location | NAP Account # | Start Date | End Date |
|---|---|---|---|---|---|
| 1 | Lewis Central School System | Lewis Central School East Hill | 1031 | 12/1/97 | 6/1/98 |
| 2 | Lewis Central School System | Lewis Central School East Hill | 1032 | 12/1/97 | 10/1/98 |

Supplier Bid Summary

| | Gas Group Review | | | | Bid Prices | |
|---|---|---|---|---|---|---|
| # | Total Units | Daily Avg | Trigger Price | Total Price | Unit Price | Basic Price |
| 1 | 6000 | 16.67 | $2.67 | $3.27 | $2.60 | $0.67 |
| 2 | 25000 | 69.44 | $2.50 | $3.10 | $2.50 | $0.60 |

Back To Previous Page

FIG. 16

| *Bid Watch* | Gas Posts | Electric Posts | Support! | Post Home | REX Home |

Post # 1027 - Purchases for Dec 2 - buyer2

LDC: Virginia Natural Gas     Close Date: 12/30/97 7:43:05 PM

Status: Open     Time Left: 21 Days

Current Bid Summary as of: 12/9/97 7:50:09 AM

Group #1 - Fixed price purchases

| Supplier | Total Units | TotalCost | Total Price Weighted Avg | Unit Price Weighted Avg | Basic Price Weighted Avg | High-Low | Last Bid |
|---|---|---|---|---|---|---|---|
| Duke-Louis Dreyfus | 31000 | $93,000.00 | $3.00 | $2.33 | $0.67 | $0.00 | 11/30/97 7:31:22 PM |
| Enserch | 31000 | $97,120.00 | $3.13 | $2.52 | $0.61 | $0.17 | 11/30/97 7:41:27 PM |

Group #3 - variable pricing

| Supplier | Total Units | Index Price | Index Used | Last Bid |
|---|---|---|---|---|
| Duke-Louis Dreyfus | 100400 | Nymex + 2% | Nymex | 11/30/97 7:30:12 PM |
| Enserch | 80000 | nymex + .02% | Nymex | 11/30/97 7:38:02 PM |
| Enserch | 20400 | nymex + .041% | Nymex | 11/30/97 7:38:02 PM |

Refresh Rate: [Don't Refresh! ▽]    [Set Rate]

[Refresh Now!]    [Gas Post]

FIG. 17

| Select Winning Bid | Gas Posts | Electric Posts | Support! | Post Home | REX Home |

Post # 1027 - Purchases for Dec 2 - buyer2    Close Date: 12/30/97 7:00:00 PM

LDC: Virginia Natural Gas    Status: Closed

Bid Summary

Group #1 - Fixed price purchases

| Supplier | Total Units | TotalCost | Total Price Weighted Avg | Unit Price Weighted Avg | Basic Price Weighted Avg | High-Low | Last Bid |
|---|---|---|---|---|---|---|---|
| ⦿ Duke-Louis Dreyfus | 31000 | $93,000.00 | $3.00 | $2.33 | $0.67 | $0.00 | 11/30/97 7:31:22 PM |
| ○ Enserch | 31000 | $97,120.00 | $3.13 | $2.52 | $0.61 | $0.17 | 11/30/97 7:41:27 PM |

Group #3 - variable pricing

| Supplier | Total Units | Index Price | Index Used | Last Bid |
|---|---|---|---|---|
| ⦿ Duke-Louis Dreyfus | 100400 | Nymex + 2% | Nymex | 11/30/97 7:30:12 PM |
| ○ Enserch | 80000 | nymex + .02% | Nymex | 11/30/97 7:38:02 PM |
| ○ Enserch | 20400 | nymex + .041% | Nymex | 11/30/97 7:38:02 PM |

| Record Bid Winners |    | Gas Post |

| *Gas Bid* | Natural Gas | Electricity | Contact Us | Support! |

Gas Basis and Commodity Bid

LDC: Virginia Natural Gas

Post-Group ID: 1014-2    Close Date/Time: 12/25/97 11:16:37 AM

Total Decatherms: 12162    Time Remaining: 30 Days

| Gas Group Review | | | | Bid Prices | | |
|---|---|---|---|---|---|---|
| # | Total Dth | Avg Daily | Trigger Price | Basis Price | Commodity Price | Total Price |
| 1 | 6156 | 41.04 | 1 | 0.67 | 2.1 | 2.92 |
| 2 | 6006 | 40.04 | 1 | 0.757 | 2.25 | 3.007 |

| Use first Price for All | Calculate Totals | Send Bid | Return to Gas LDCs |

FIG. 20

RELEVANT ART

ENERGY NETWORK COMMERCE SYSTEM

CROSS-REFERENCE TO RELATED APPLICATIONS (Not Applicable)

STATEMENT REGARDING FEDERALLY SPONSORED RESEARCH (Not Applicable)

BACKGROUND OF THE INVENTION

1. Field of the Invention

The present invention is directed generally to an energy network commerce system and, more particularly, to an energy network commerce system that facilitates the management of energy transactions.

2. Description of the Background

With the deregulation of the various sectors of the energy industry, retail energy consumers are faced with a myriad of choices when it comes to selecting an energy provider. Consumers must wade through voluminous and oftentimes confusing and conflicting data to try and find the most cost effective provider that will meet their demands. Also, energy providers must be able to reach all consumers who may need their products to communicate rate and availability data. This requirement necessitates the need for sales and marketing overhead, which raises the price of the energy being supplied.

FIG. 22 illustrates a process from the relevant art which is designed to facilitate the energy transactional process. A database 10 stores information relevant to the energy consumption of customers, such as contact information and consumption and billing information for the geographic sites and accounts of each customer. An agent, which is responsible for managing individual customers, can update the database at step 12. At step 14, the agent identifies customers to purchase for based on the customers that need contracts. At step 16, the agent (or alternatively the customer) posts a buy order for customers needing contracts via facsimile to energy suppliers. At step 18, suppliers submit bids on the buy orders to fulfill the customer's energy requirements. At step 20, a buyer selects a bid which meets the customer's requirements, thus forming a contract between the supplier and the customer. At steps 22 and 24, the buyer notifies the agent and the supplier, respectively, of the executed contract via the telephone, email, or electronically.

The only computer activity in the process illustrated in FIG. 22 concerns the update/query of the database 10. The process of FIG. 22 is thus a single user (i.e. the agent) environment that is not networked. The process of FIG. 22 relies on facsimile machines and telephones, which tend to be inherently unreliable modes of communication when compared with computerized processes. Thus, agents which post bids using the process of FIG. 22 may not reach all eligible suppliers. Furthermore, it is difficult to track communications between parties and thus miscommunications may result.

Thus, there is a need for a computer network system which can facilitate the agreement process between energy consumers and energy suppliers in which energy volumes are aggregated for one or more consumers for bulk purchasing and each consumer gets its own account-specific transaction. There is a further need for an energy network system which can match a consumer's energy needs with a cost-effective energy supplier in real time with little involvement by the consumer or the supplier. There is also a need for an energy network system which avoids repeated price disclosures by energy suppliers. There is also a need for an energy network system which can manage all data related to the energy contracting process and can allow differing levels of access to the data by various parties. There is also a need for an energy network system that allows for client information management and for purchasing and contract tracking. There is a further need for an energy network system that allows for contract management and electronically implements a "post and bid", or reverse auction process in real time.

SUMMARY OF THE INVENTION

The present invention is directed to a computer-assisted method of facilitating a transaction between an energy consumer-client desiring an energy contract and an energy supplier. The method includes posting a buy order where the supplier can access the buy order via a computer network and receiving a bid from the supplier via the network. The method also includes accepting the bid via the network when a precondition is met.

The present invention has the advantage that it can facilitate the agreement process between energy consumers and energy suppliers in which energy volumes are aggregated for one or more consumers for bulk purchasing and each consumer gets its own account-specific transaction. The present invention has the further advantage that it can match a consumer's energy needs with a cost-effective energy supplier in real time with little involvement by the consumer or the supplier. The present invention also has the advantage that it avoids repeated price disclosures by energy suppliers. The present invention also has the advantage that it can manage all data related to the energy contracting process and can allow differing levels of access to the data by various parties. The present invention also has the advantage that it allows for client information management and for purchasing and contract tracking. The present invention has the further advantage that it allows for contract management and electronically implements a "post and bid", or reverse auction process in real time. The present invention also has the advantage that it allows for a contract to be formed for a future energy need and does not limit contract formation to the time that the contracted-for product is required. The present invention has the further advantage of reducing costs for energy consumers compared with traditional systems and methods of energy consumer-supplier contract formation.

BRIEF DESCRIPTION OF THE DRAWING

For the present invention to be clearly understood and readily practiced, the present invention will be described in conjunction with the following figures, wherein:

FIGS. 2–20 illustrate examples of screen printouts of screens generated by the various modules of the system of FIG. 1;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in a typical computer network. For example, specific operating system details and modules are not shown. Also, specific network items such as network routers are not shown. Those of ordinary skill in the art will recognize that other elements are desirable and/or required to produce an operational system incorporating the present invention. However, because such elements are well known in the art, and because they do not facilitate a better understanding of the present invention, a discussion of such elements is not provided herein.

For clarity, the roles and identities of the parties discussed herein are detailed. A system administrator is responsible for maintaining the overall integrity of the system and may set and record the commission rates due other-parties. Alternatively, the system administrator may be responsible for maintaining the overall integrity of the system and a third party system owner may set and record the commission rates due other parties and manage the business aspects of the system such as ensurinig that agreements are in place to govern the relationships between the parties.

A client is the party who is the consumer of the energy product and for whom energy is being bought from a supplier who can be, for example, an energy producer, supplier, broker, or distributor. A client may have multiple geographic locations and each location for each client may have multiple accounts (e.g. gas and electricity). The term "client" is used herein to distinguish the client from the buyer and also to indicate that the client is a client of the owner of the energy network commerce system of the present invention.

A buyer contracts with energy suppliers to become eligible suppliers, starts the bidding process, executes the winning bid, and facilitates contact between the client and the supplier after a contract is executed. An agent solicits new clients for entry into the system and manages the database entries relevant to that client. The agent also determines which clients have contracts which are set to expire in the near future (e.g. 90 days). Alternatively, the functions of the agent could be performed by the buyer, the client, or the system administrator.

Certain of the parties described herein may be the same entities (e.g. the buyer and the agent or the buyer and the administrator), but they may be treated by the system of the present invention as disparate parties for purposes of privileged access to the data in the database which stores the information necessary for energy transactions to be completed using the system and methods of the present invention.

Figure 1:
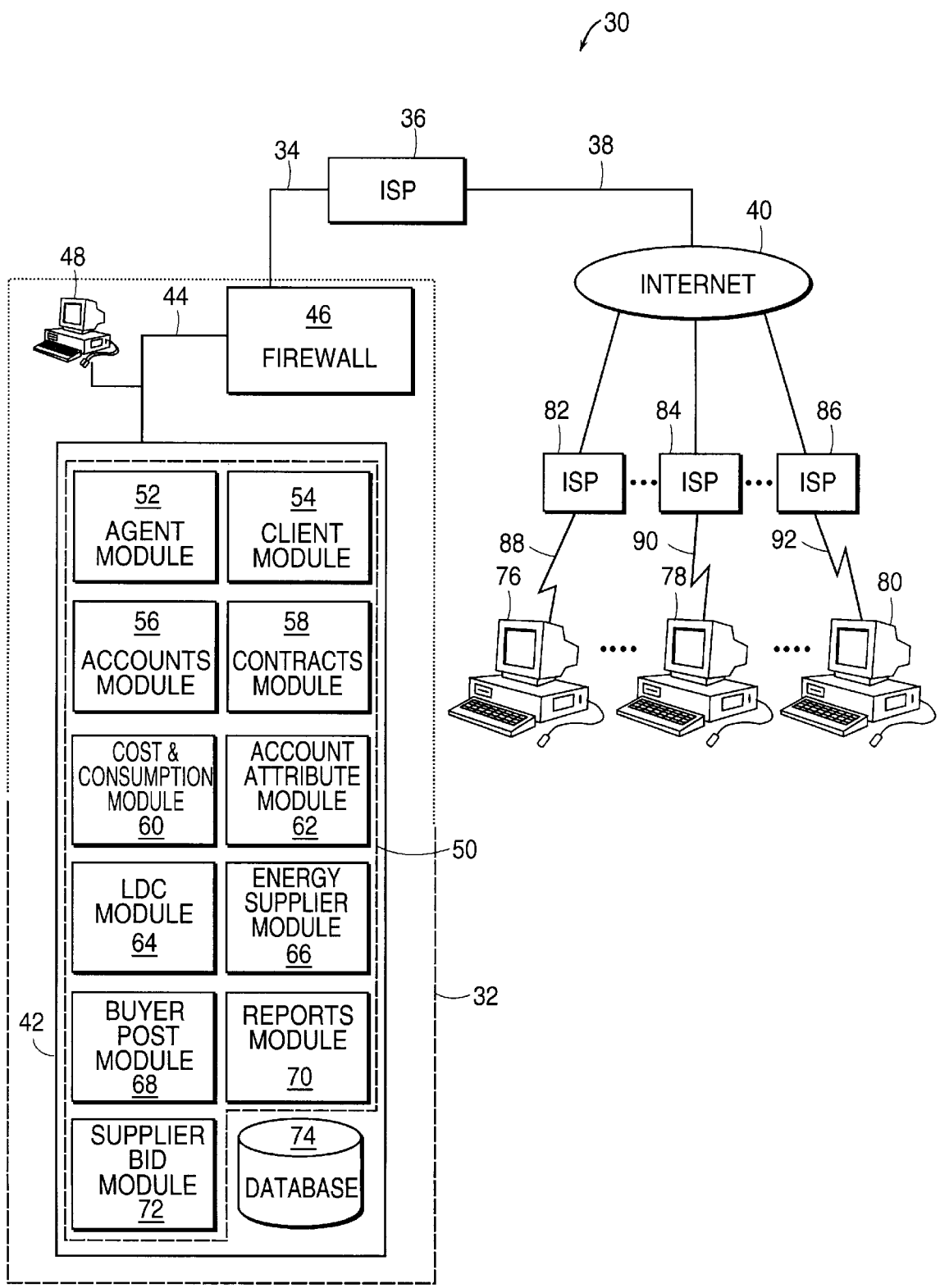
FIG. 1 is a diagram illustrating an energy network commerce system of the present invention.

FIG. 1 is a diagram illustrating an energy network commerce system 30 of the present invention. The system 30 includes a host network 32 which is connected, via a communications link 34 to an Internet service provider (ISP) 36. The communications link 34 can be, for example, a fractional T1 line. The ISP 36 is connected to the Internet 40 via a communications link 38 which can be, for example, a T3 line. The details of the interconnections between the communications links 34 and 38 and the ISP 36 are not essential for an understanding of the present invention and any such arrangement commonly used may be employed to achieve the desired result of connecting the host network 32 to the Internet 40. The network 32 includes a server 42 which is connected through a communications link 44 to a firewall 46. The communications link 44 can be, for example, a local area network. The firewall 46 can be any type of firewall suitable such as, for example, a packet filter, an applications gateway, a circuit-level gateway, or a proxy server. The server 42 hardware platform can be any type of server platform suitable such as, for example, a DEC Alpha server manufactured by Digital Equipment Corporation or a network server incorporating Intel microprocessor technology. The server 42 operating system software can be, for example, Microsoft Windows NT 4.0 Server. At least one computer 48 is connected to the communications link 44 such that a system administrator can access the server 42.

The server 42 includes a collection of modules 50 resident on a Web server which can be any type of Web server suitable such as, for example, Microsoft Internet Information Server 3.0 or Netscape Enterprise Server Pro 3.0. The collection of modules 50 includes modules 52, 54, 56, 58, 60, 62, 64, 66, 68, 70, and 72, which are the software portion of the system 30 that facilitates the formation of contracts between energy buyers and energy suppliers. The modules in the collection of modules 50 may be implemented in any suitable computer language such as, for example, C++ or Java using, for example, object-oriented techniques.

The modules in the collection of modules 50 have the ability to access a database 74 to complete the respective tasks of each module. The database 74 can be any type of suitable database such as, for example, Microsoft SQL Server 6.5. The modules in the collection of modules 50 interact with the database 74 through a back-end module (not shown), which handles database queries and can call any database stored procedures. The back-end module may be implemented in any suitable language such as, for example, VBScript or JavaScript. Certain of the data stored in the database can be encrypted for added security using any suitable encryption method such as, for example, full 128-bit DES encryption.

An agent module 52 is used to facilitate the management of information concerning the authorized agents that have access to and may use the system 30. For example, agent information such as the agent name, responsible geographical area (e.g. a county in a state), and commission structure can be stored in the database 74. This information can be created, viewed or updated using the agent module 52. FIG. 2 illustrates a screen printout of a screen presented by the agent module 52 which allows for agent information to be entered.

Figure 3:
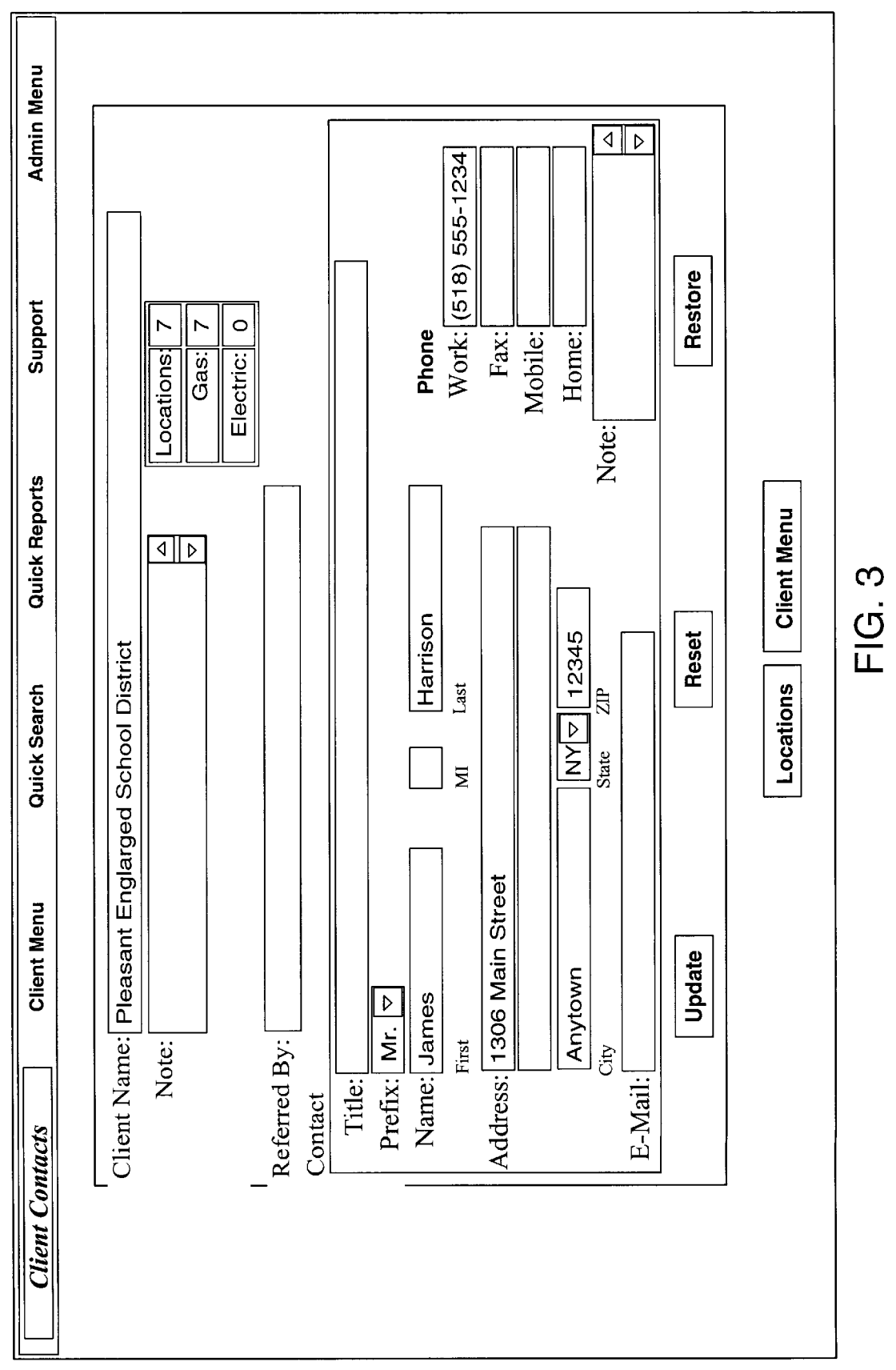
Figure 4:
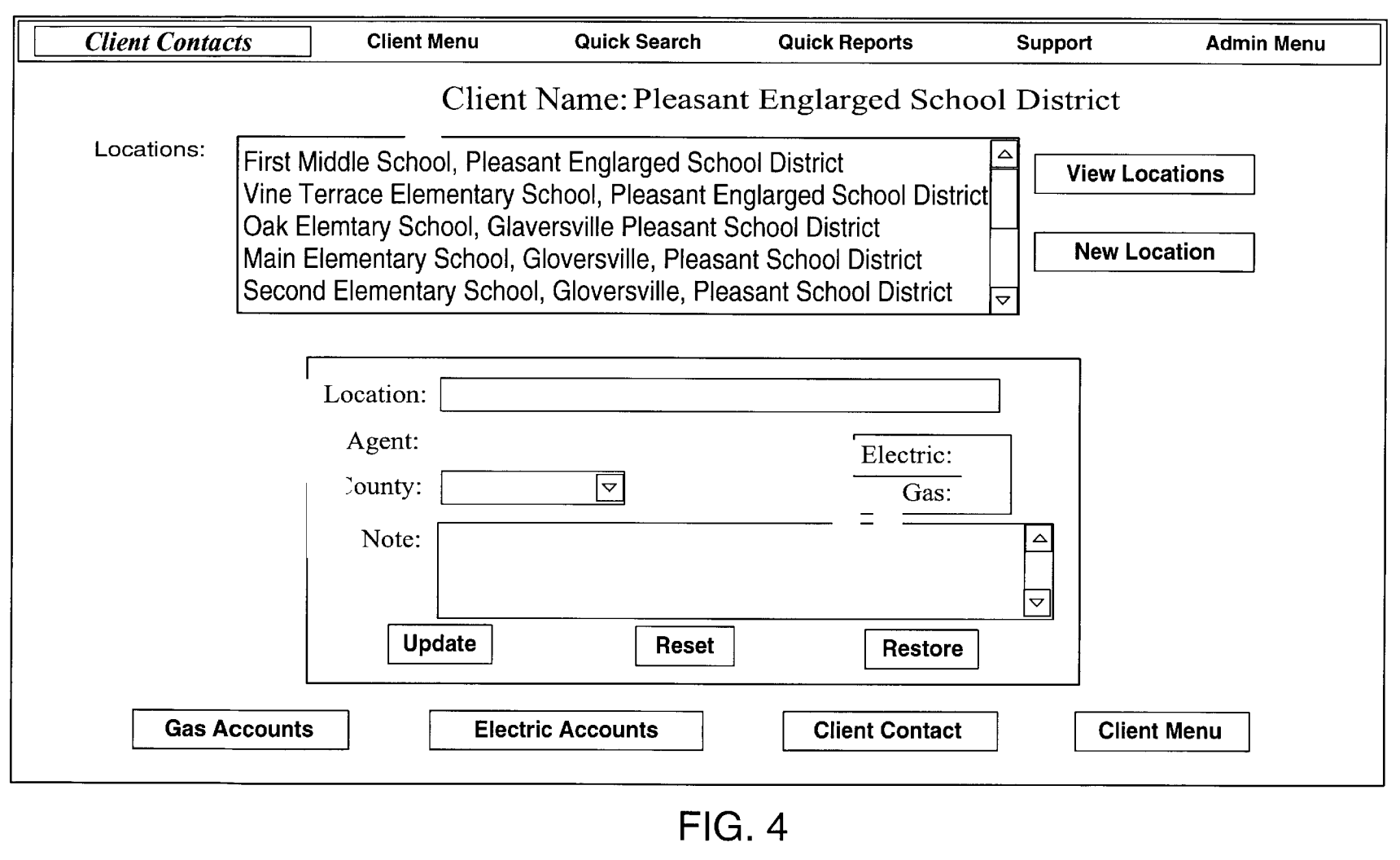

A client module 54 allows for the updating, creating, and viewing of data in the database 74 related to energy clients of the system 30. The database 74 stores information about each client such as the client name and the location and number of each utility account of the client. FIG. 3 illustrates a screen printout of a screen presented by the client module 54 which allows for client information to be entered. FIG. 4 illustrates a screen printout of a screen that appears after the "Locations" option is selected from the screen of FIG. 3.

An accounts module 56 allows for the updating, creating, and viewing of data in the database 74 related to the account information of each client in the database 74. The data includes, for example, the local distribution company or companies (LDC) of the client, rate classes, and levels of commitment. FIG. 5 illustrates a screen printout of a screen presented by the accounts module 56 which allows for account information to be managed.

A contracts module 58 allows for the updating, creating, and viewing of data in the database 74 related to all the contracts for each client. The data can include, for example, the contract start date, the contract duration, and the contract status (i.e. historical, current, or future). FIG. 6 illustrates a screen printout of a screen presented by the contracts module 58 which lists all the contracts for each account. FIG. 7 illustrates a screen printout that results when a contract ID is selected on the screen of FIG. 6.

Figure 10:
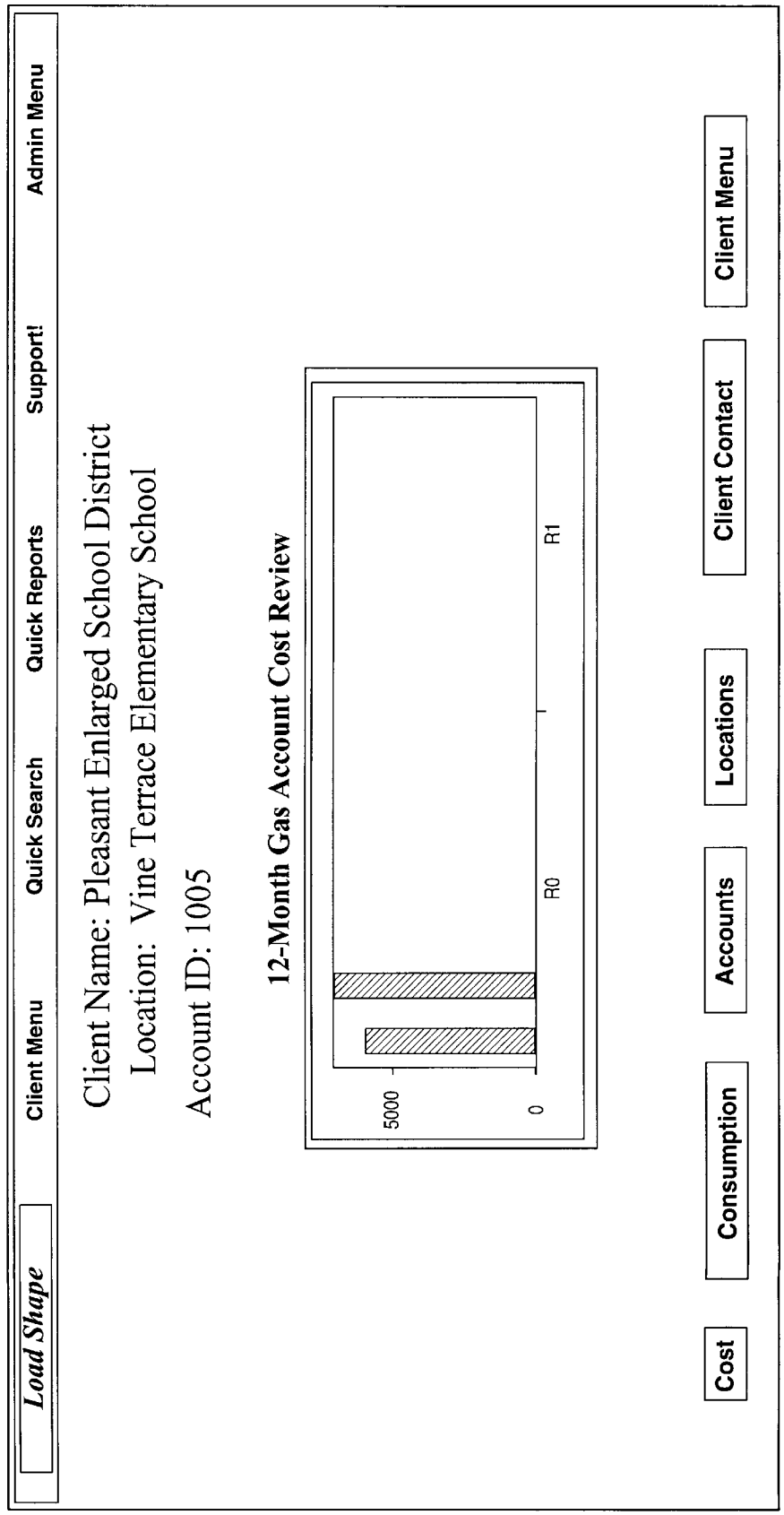

A cost & consumption module 60 allows for the updating, creating, and viewing of data in the database 74 related to the cost and consumption for each account of each client. The data can include, for example, price at the delivery point, supplier base cost and total charges. The cost and consumption data allows for the tracking of consumption for a period of time of interest such as a 12-month period. FIG. 8 shows a screen printout of a cost review, FIG. 9 shows a screen printout of a consumption review, and FIG. 10 shows a screen, printout of a load shape as generated by the cost & consumption module 60. FIG. 11 shows a screen printout of a screen presented by the cost & consumption module 60 which allows for the entry of cost and consumption information.

Figure 12:
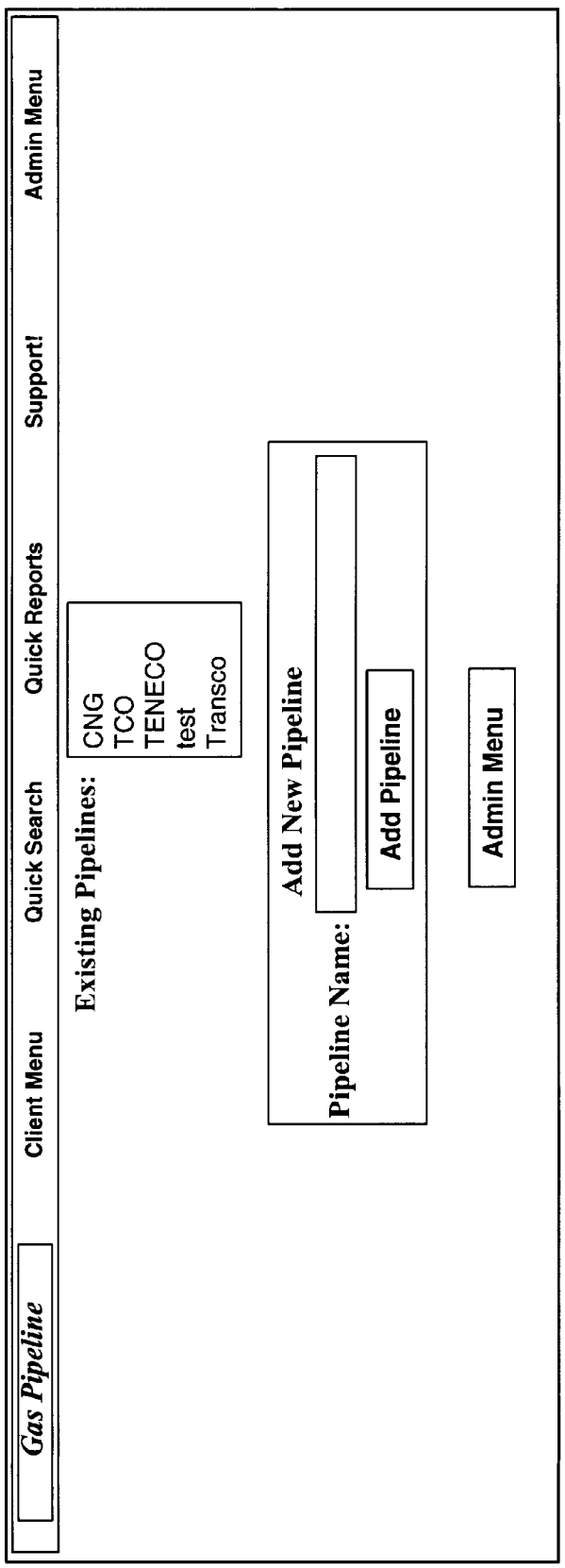

An account attribute module 62 allows for the updating, creating, and viewing of data in the database 74 related to the attributes of, for example, pipelines, geographic zones, electric substations, and transmission wires. FIG. 12 illustrates a screen printout of a screen generated by the account attribute module 62 which allows a pipeline to be added to or deleted from the database 74.

An LDC module 64 allows for the updating, creating, and viewing of data in the database 74 related to local distribution companies. The data can include, for example, the LDC name, address, and rate class. FIG. 13 illustrates a screen printout of a screen generated by the LDC module 64 which allows the user to view or update information about an LDC.

An energy supplier module 66 allows for the updating, creating, and viewing of data in the database 74 related to each energy supplier. The data can include, for example, the supplier name, address, and an identification number. FIG. 14 illustrates a screen printout of a screen generated by the energy supplier module 66 which allows the user to view and update the information relating to energy suppliers in the system.

A buyer post module 68 allows buyers to pool clients with the same LDC that have similar contract needs into groups. The formation of groups with like needs facilitates the bidding process by energy suppliers and allows for bulk pricing. Buy orders are created for each group and are posted to so that energy suppliers may bid online to fill the buy orders. The buy order includes such information as the LDC name, the open date and close date/time for the bidding period, and the commission plan and rate being requested. Using the buyer post module 68, the buyer can monitor bids as they are submitted by suppliers and can select a bid to be the "winning bid", i.e. the bid that best fits the requirements of the buy order. The buyer post module 68 facilitates the selection of the best contract by the buyer by highlighting the best bid as determined by calculating the total cost summation of all the contracts in a group using the prices supplied in the bid. Also, the buyer post module 68 ranks the bids based on a "high-low" delta, which is computed by subtracting the lowest priced contract from the highest priced contract. A low delta indicates that for all contracts in a group, one contract has not received a significantly better price than another. FIG. 15 illustrates a screen printout of a screen generated by the buyer post module 68 which allows the user to view, update, and create buy orders to be posted. FIG. 16 illustrates a screen printout of a screen generated by the buyer post module 68 which allows the user to view a supplier's bid in detail. FIG. 17 illustrates a screen printout of a screen generated by the buyer post module 68 which allows the buyer to monitor bids and FIG. 18 illustrates a screen printout of a screen generated by the buyer post module 68 which allows the buyer to select the best supplier bid.

A reports module 70 generates relevant reports for each of the modules as requested by a user of the system 30. The reports can include, for example, reports of expired and about to expire contracts for clients in the database 74, an energy delivery activity report for a particular LDC, a client listing report, or a commission report. The reports can also include reports generated for a client such as, for example, cost and consumption reports.

Figure 19:
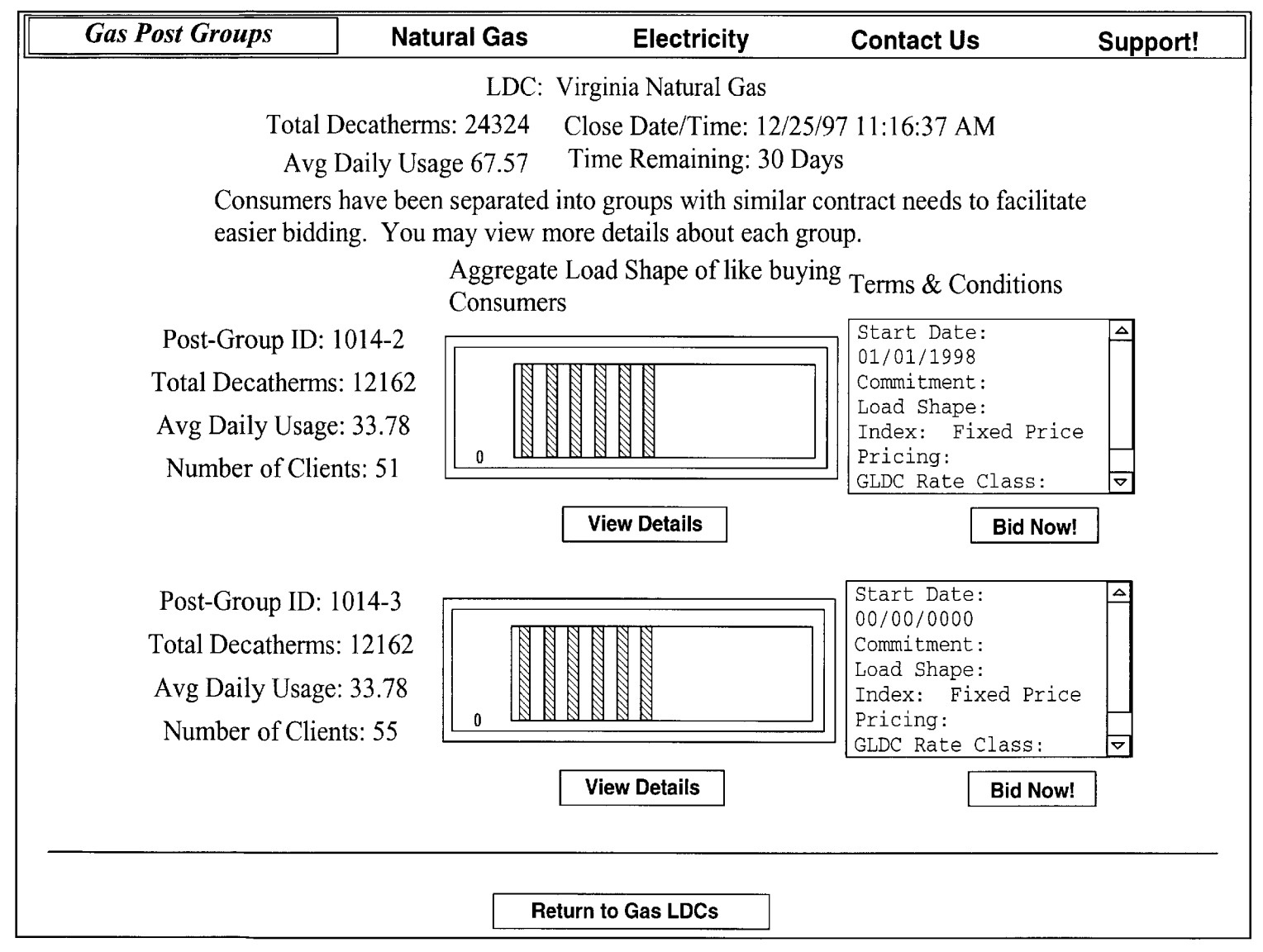

A supplier bid module 72 allows energy suppliers to bid on buy orders which are posted by buyers using the buyer post module 68. When a supplier invokes the supplier bid module 72, the supplier can view all open buy orders for each LDC. The supplier can view the information needed to submit a bid, but the supplier bid module 72 does not reveal the identity of the clients for whom the buy orders have been posted. The supplier bid module 72 also displays a graphical load shape detailing the usage pattern of the clients in the buy order, the number of clients in the buy order, the average and total usage of the clients, and the close date and time of the buy order. The supplier bid module 72 allows suppliers to submit as many bids as desired, and only the latest bid is considered to be valid. Thus, suppliers may submit a bid and update it based on changes in market conditions, etc. FIG. 19 illustrates a screen printout of a screen generated by the supplier bid module 72 to allow the user to view information on each client group with posted buy orders. FIG. 20 illustrates a screen printout of a screen generated by the supplier bid module 72 which allows an energy supplier to bid on a buy order.

Users 76, 78, and 80 can access the host network 32 via the Internet through Internet service providers 82, 84, and 86. The users 76, 78, and 80 may access the network 32 using any type of computer suitable such as, for example, an IBM compatible PC, an Apple Macintosh, a workstation, a personal decision aid (PDA), or an application specific integrated circuit (ASIC). The users 76, 78, and 80 are connected to the internet service providers 82, 84, and 86 via communication links 88, 90, and 92 which can be any type of communication link suitable such as, for example, conventional telephone lines. The users 76, 78, and 80 may be any party that is authorized to access the network 32 such as a client, an agent, a buyer, or a supplier.

Access to the network 32 is obtainable only by those users with valid userids and passwords. Each userid is associated with a type of user that has privileges to access and update only certain data. Depending on the type of user accessing the network 32, the user may not have access to each module in the collection of modules 50. For example, a user identified as a supplier would only have access to the supplier bid module 72. Also, depending on the type of user accessing a module, all of the data and functions of the accessed module may not be available to the user. For example, only a system administrator user is able to create or update the information pertaining to an agent using the agent module 52.

The users 76, 78, and 80 can interface with the network 32 using any type of Internet browser such as, for example, Microsoft Internet Explorer or Netscape Navigator. The pages presented to the users 76, 78, and 80 can be presented using any type of suitable technology such as, for example, HTML, Java, or ActiveX. The collection of modules 50 includes software code which validates input fields on HTML forms that are presented to the user by the collection of modules 50. The software can be implemented in any suitable language such as, for example, VBScript or JavaScript.

Figure 21:
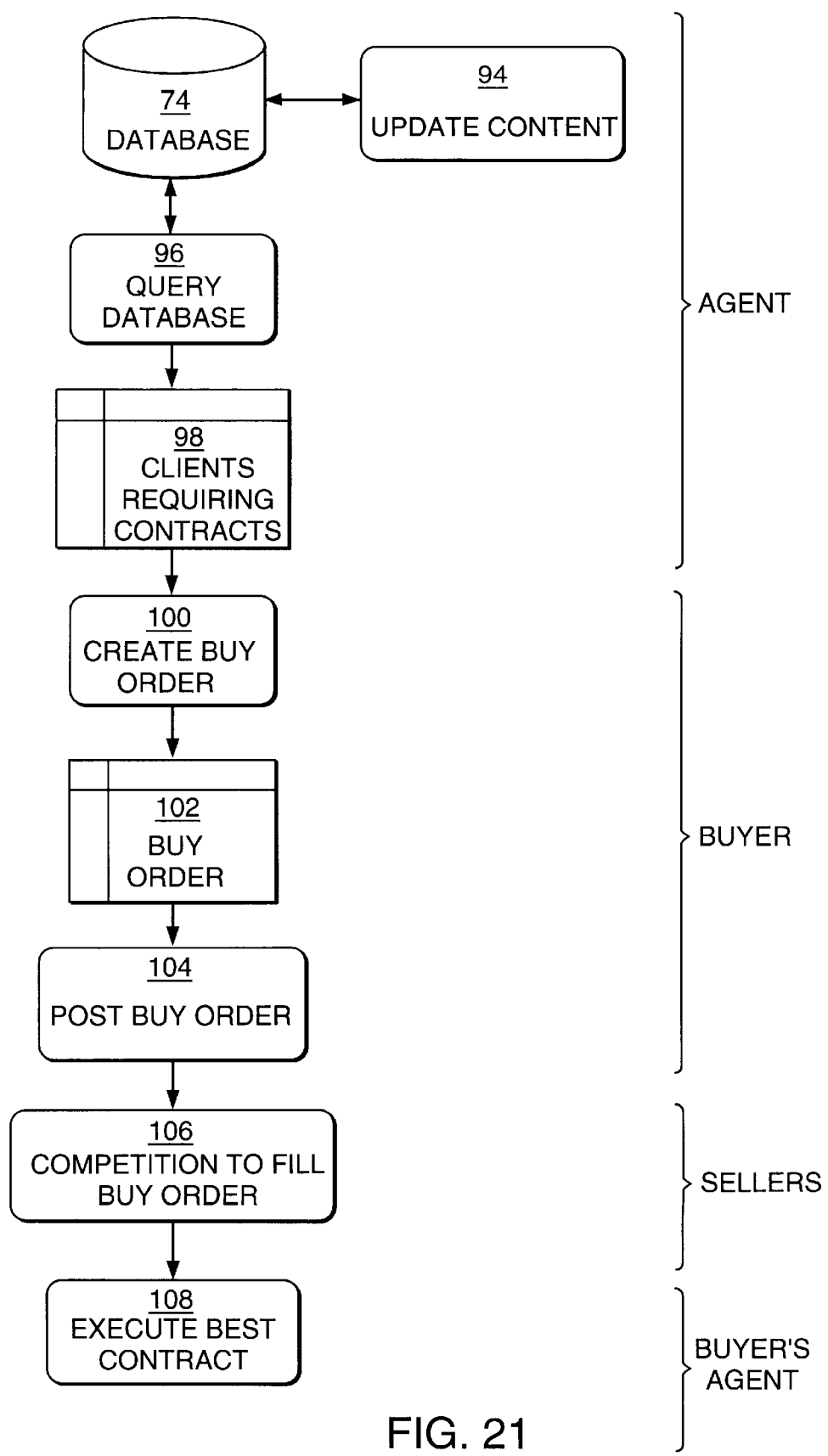
FIG. 21 is a diagram illustrating a typical flow through the network commerce system of FIG. 1.
Figure 22:
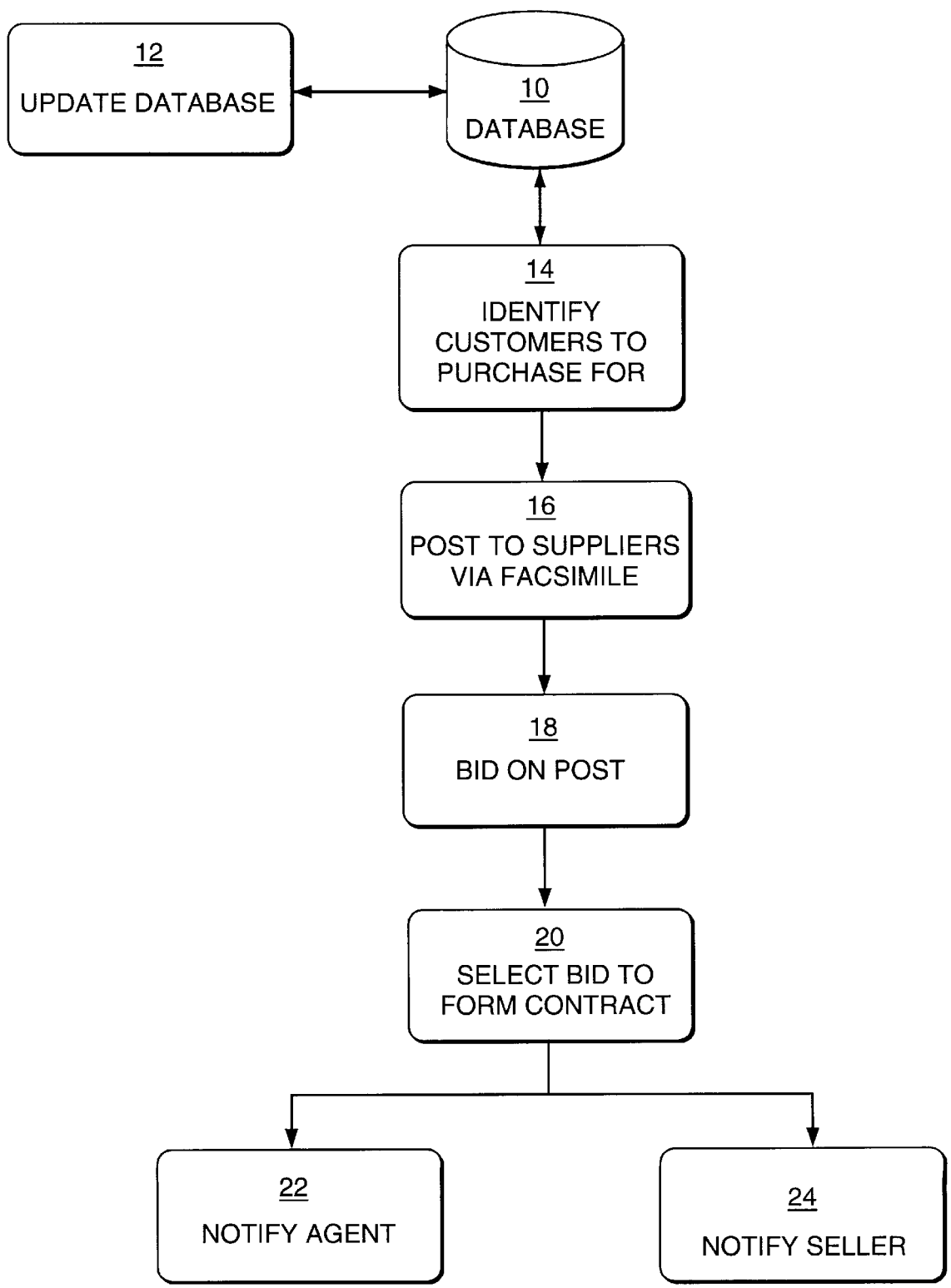
FIG. 22 is a diagram of an energy contracting process from the relevant art.

FIG. 21 is a diagram illustrating a typical flow through the network commerce system 10 of FIG. 1. As illustrated at 94, the agent is responsible for updating and creating the client information stored in the database 74. At step 96, the agent queries the database 74 for information about which clients in the database 74 have accounts which require energy supplier contracts and a list of clients requiring contracts 98 is generated. At step 100, the buyer generates a buy order 102 for each client group based on the historical data for the accounts for which the buy order is being generated. The buy order 102 is created with all the information necessary to complete the contracting process except the name of the supplier and the final contract price. The buy order 102 can be nonspecific as to the acceptable terms on which the buyer will contract with a supplier or the buy order 102 can specify a particular target price so that the first supplier to bid at that price will win the bid. Also, the buy order 102 does not have to disclose such a target price. The buy order 102 may be left open for a limited period of time (e.g. days), may be open for a long period of time (e.g. months), or may close at a specific hour.

At step 104, the buyer posts the buy order 102 and suppliers, at step 106, access the buy orders in the system and compete to fill the buy order 102. The buy order 102 may be posted at any time before the client (or group of clients) requires a contract. During the competition at step 106, the suppliers do not know the identity of the client. Suppliers are only able to find out the information needed to compete to fill the buy order 102 such as, for example, the delivery point, the load shape, and the terms and conditions under which a contract will be formed. At step 108, the buyer executes the best contract for the client based on step 106. The execution of the contract by the buyer creates a contract between the client and the supplier. The supplier only learns the client's identity when the contract is executed.

The client will typically pay for the energy product on a monthly or quarterly basis as the energy is consumed. Other methods of payment such as, for example, a direct bank debit, the charging of a credit card, or the transfer of electronic money may be used upon execution of the contract if the terms of the bid and subsequent contract warrant.

Following the execution of the contract, a confirmation may be sent to the agent and the supplier automatically. The confirmation can be digitally signed before sending so that the receivers will be able to verify the authenticity of the confirmation.

While the present invention has been described in conjunction with preferred embodiments thereof, many modifications and variations will be apparent to those of ordinary skill in the art. For example, although the energy network commerce system has been described hereinabove as being implemented using the Internet, the teachings of the present invention may be used to implement the system on any type of network such as, for example, an intranet or a local area network. Also, although the present invention has been described as being applied to the energy industry, the system and methods of the present invention are applicable to any type of commerce industry which utilizes a contracting process. The foregoing description and the following claims are intended to cover all such modifications and variations.

What is claimed is:

1. A computer-assisted method of facilitating a retail energy transaction between one or more energy consumer-clients desiring retail energy contracts and energy suppliers, comprising:

storing energy usage patterns for said one or more energy consumer-clients;

aggregating energy demand for said one or more energy consumer-clients based upon at least one similar attribute;

constructing an aggregated buy order that includes said usage patterns of said one or more energy-consumer clients;

posting said aggregated buy order in order to satisfy said aggregated energy demand where said energy suppliers can access said buy order via a computer network;

examining, by said energy suppliers, said usage patterns;

receiving bids from said energy suppliers via said network, each of said bids comprising one of a fixed price bid and a variably priced bid based on a market index;

ranking said bids based on one of a price difference between a highest bid and a lowest bid and a price difference relative to said market index;

accepting one of said bids via said network when a precondition is met; and providing each of said one or more energy consumer-clients an account specific transaction.

2. The method of claim 1, wherein said precondition includes a most preferential bid.

3. The method of claim 1, wherein said precondition includes a thresholds price.

4. The method of claim 1, further comprising creating said buy order based on historical data.

5. The method of claim 4, further comprising a database to determine if said energy client requires a contract for energy services.

6. The method of claim 1, wherein accepting said bid includes accepting said bid to form a contract when said precondition is met.

7. The method of claim 1, further comprising sending notification to said supplier of said bid acceptance.

8. The method of claim 1, further comprising sending notification to said client of said bid acceptance.

9. The method of claim 1 wherein ranking said bids comprises subtracting a lowest priced contract from a highest priced contract.

10. The method of claim 1, wherein aggregating energy demand comprises aggregating energy demand for a client having multiple accounts.

11. The method of claim 1, wherein constructing an aggregated buy order comprises including a particular target price.

12. The method of claim 1, wherein accepting one of said bids comprises a buyer accepting a best bid.

13. A computer-readable medium having stored thereon instructions which, when executed by a processor, cause said processor to perform the steps of:

determining a plurality of energy consumer-clients' energy needs based on data in a database;

grouping a plurality of clients having at least one similar attribute to create at least one group of said clients;

creating at least one bulk purchase buy order for said group;

posting said bulk purchase buy order where said energy suppliers can access said buy order via a computer network;

receiving bids from said energy suppliers via said network;

ranking said bids based on one of a price difference between a highest bid and a lowest bid and a price difference relative to a market index;

accepting one of said bids via said network when a precondition is met; and providing each of said one or more energy consumer-clients an account-specific transaction from said bulk purchase.

14. An apparatus for facilitating retail energy transactions, comprising:

means for storing energy usage patterns for one or more energy consumer-clients;

means for aggregating a retail energy demand for said one or more energy consumer-clients;

means for constructing an aggregated buy order that includes said usage patterns of said one or more energy consumer-clients;

means for posting said aggregated buy order to satisfy said aggregated retail energy demand where energy suppliers can access said buy order via a computer network;

means for examining, by said energy suppliers, said usage patterns;

means for receiving bids from said energy suppliers via said network;

means for ranking said bids based on one of a price difference between a highest bid and a lowest bid and a price difference relative to a market index;

means for accepting one of said bids via said network when a precondition is met; and means for providing each of said one or more energy consumer-clients an account-specific transaction from said bulk purchase.

15. The method of claim 1 wherein posting said aggregated buy order comprises a consumer-client or agent posting a buy order to serve aggregated retail energy demand; receiving bids comprises reviewing bids from energy suppliers over a period of time; and accepting one of said bids comprises accepting a bid when the price for energy has dropped to a satisfactory price.

* * * * *